(12) United States Patent
Shiromaru

(10) Patent No.: US 7,211,664 B2
(45) Date of Patent: May 1, 2007

(54) PROCESS FOR THE PRODUCTION OF EPSILON CRYSTAL FORM COPPER PHTHALOCYANINE

(75) Inventor: Osamu Shiromaru, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 121 days.

(21) Appl. No.: 11/086,364

(22) Filed: Mar. 23, 2005

(65) Prior Publication Data

US 2005/0215780 A1    Sep. 29, 2005

(30) Foreign Application Priority Data

Mar. 26, 2004  (JP)  .............. 2004/091535
Mar. 26, 2004  (JP)  .............. 2004/091537
Dec.  3, 2004  (JP)  .............. 2004/350741

(51) Int. Cl.
     C07B 47/00   (2006.01)
(52) U.S. Cl. .................................................. 540/145
(58) Field of Classification Search ............ 424/9.362, 424/9.61; 540/145; 534/15; 514/185, 410
     See application file for complete search history.

(56) References Cited

U.S. PATENT DOCUMENTS 2,770,629 A  * 11/1956  Eastes ........................ 540/141
4,135,944 A    1/1979   Wheeler
5,252,417 A  * 10/1993  Tokida et al. ............ 430/58.05
5,656,751 A    8/1997   Tanaka et al.
2002/0014183 A1  2/2002  Hall-Goulle et al.

FOREIGN PATENT DOCUMENTS

| EP | 422907 A2 * | 4/1991 |
| EP | 1 130 065 A2 | 9/2001 |
| FR | 2 174 089 | 10/1973 |
| FR | 2 364 954 | 4/1978 |
| GB | 1411880 | 10/1975 |

OTHER PUBLICATIONS

March et al. Advanced Organic Chemistry—Reactions, Mechanisms, and Structure. Fourth Edition. John Wiley & Sons. 1992. pp. 260-263.*

* cited by examiner

Primary Examiner—James O. Wilson
Assistant Examiner—Paul V. Ward
(74) Attorney, Agent, or Firm—Wenderoth, Lind & Ponack, L.L.P.

(57) ABSTRACT

A process for the production of an ε crystal form copper phthalocyanine, which process comprises heat-treating a copper phthalocyanine in a solvent at from 80° C. to 250° C. in the presence of a Lewis acid.

9 Claims, 3 Drawing Sheets

US 7,211,664 B2

PROCESS FOR THE PRODUCTION OF EPSILON CRYSTAL FORM COPPER PHTHALOCYANINE

FIELD OF THE INVENTION

The present invention relates to a process for the production of an ε crystal form copper phthalocyanine, which comprises bringing a mixture of a copper phthalocyanine and a phthalocyanine derivative into contact with a solvent in the presence of a Lewis acid, thereby transforming the copper phthalocyanine into the ε crystal form.

PRIOR ARTS OF THE INVENTION

ε crystal form copper phthalocyanines have a reddish hue, a high clearness and a high tinting strength as compared with α crystal form copper phthalocyanines. In addition, their solvent resistance against the crystal growth of primary crystals is higher than that of β crystal form copper phtalocyanines and their solvent resistance against the crystal transformation into the β form is higher than that of other polymorph copper phthalocyanines. Therefore, the ε crystal form copper phthalocyanine is a molecular aggregate having a crystal form which has remarkably excellent properties with less apprehension about a change of hue and a decrease in tinting strength and clearness. Further, the thermodynamical stability of the ε crystals is next to that of the β crystal form which is the most stable crystal form among polymorph crystals.

The typical process for the production of the ε crystal form copper phthalocyanine is the solvent salt milling process in which a copper phthalocyanine having a crystal form other than the ε form and β form is milled in an organic solvent by means of a strong mechanical force for a long time (see JP-A-48-76925).

It is thought that the major factor, which makes it difficult to control the transformation into the ε crystal form, is its molecular disposition which is similar to the molecular disposition of the β form. From crystal structure analysis it is assumed that the peaks at a diffraction angle of 7.5° and at a diffraction angle of 9.0°, which are characteristic in the CuK α powder X-ray diffraction profile of the ε crystals, are based on the reflection on Miller index 001 plane and 20$\bar{1}$ plane, respectively, and that the ε form has a molecular disposition similar to that of the β form. It is thought that the strong mechanical force in the conventional production process plays a roll in bypassing the molecular disposition of the β crystal form of which the potential energy is minimum and prevents the transformation into the β form.

SUMMARY OF THE INVENTION

It is an object of the present invention to overcome a problem that the production of an ε crystal form copper phthalocyanine requires a strong mechanical force which exerts a large influence on a cost in view of energy and time and a problem that salts as a milling assistant and a high-boiling solvent having a high COD value, each of which gives large loading to equipment and environment, must be used.

The present invention provides a process of the production of an ε crystal form copper phthalocyanine, which process comprises heat-treating a copper phthalocyanine in a solvent at 80 to 250° C. in the presence of a Lewis acid.

The present invention further provides a process for the production of an ε crystal form copper phthalocyanine which process comprises heat-treating a mixture of 100 parts by weight of a copper phthalocyanine with 0.5 to 50 parts by weight, preferably 1 to 10 parts by weight, of a phthalocyanine derivative in a solvent at 80 to 250° C. in the presence of a Lewis acid.

EFFECT OF THE INVENTION

Figure 1:
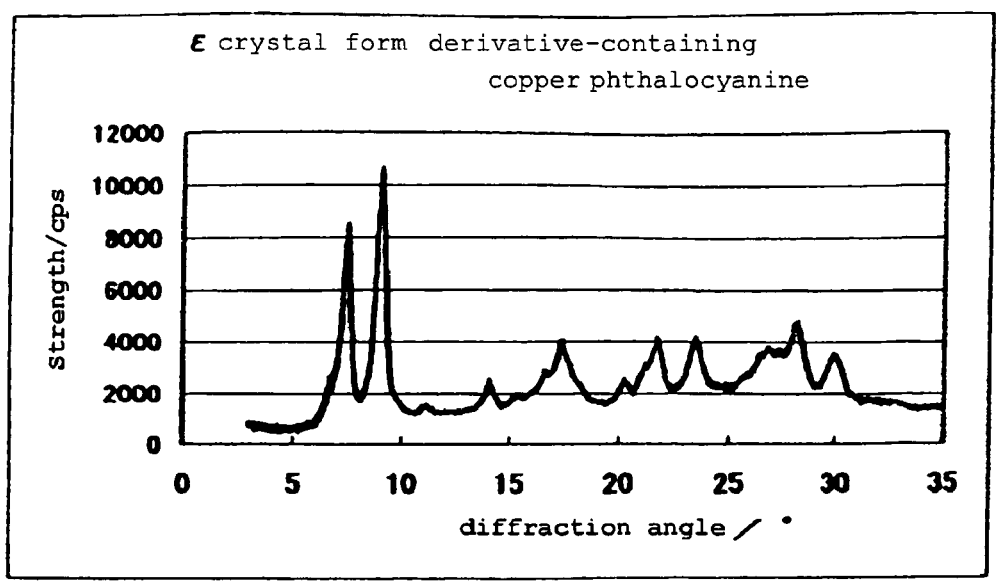
FIG. 1 shows the powder X-ray diffraction profile of an ε crystal form copper phthalocyanine which was obtained in Comparative Example.

Copper phthalocyanines are consumed in the largest quantity among organic pigments in view of hue, resistance and cost and are therefore important indigo blue pigments. Of the copper phthalocyanines, an ε crystal form copper phthalocyanine is a molecular aggregate having a remarkable excellent use suitability. According to the present invention, there is provided a process for producing an ε crystal form copper phthalocyanine without a conventionally-used strong mechanical force, which as a result sharply decreases energy and loading to equipment and environment and is remarkably advantageous in industry.

DETAILED DESCRIPTION OF THE INVENTION

The phthalocyanine derivative preferably used in the present invention is represented by the formula (1), (2) or (3),

$$\text{MePc-[X—(CH}_2\text{)jNR}_1\text{R}_2\text{]n} \tag{1}$$

wherein Me is $H_2$, Cu, Fe, Co, Ni, Zn, AlOH or FeOH, Pc is a phthalocyanine residue, X is —$CH_2$—, —$CH_2NHCOCH_2$—, —CO—, —$SO_2$—, —$CH_2NH$—, —$CH_2NHCOCH_2NH$—, —CONH— or —$SO_2NH$—, each of $R_1$ and $R_2$ is independently a hydrogen atom or an alkyl or alkenyl group having 1 to 18 carbon atoms which may have a substituent, or $R_1$ and $R_2$ together form a five-membered or six-membered ring which may contain a further nitrogen atom, j is an integer of 0 to 6, and n is an integer of 1 to 3,

$$\text{MePc-(SO}_3^-\text{N}^+\text{R}_3\text{R}_4\text{R}_5\text{R}_6\text{)k} \tag{2}$$

wherein Me and Pc have the same meanings as those in the formula (1), each of $R_3$, $R_4$, $R_5$ and $R_6$ is independently a hydrogen atom, an alkyl group having 1 to 30 carbon atoms, a substituted alkyl group having 1 to 30 carbon atoms, an alkenyl group having 1 to 30 carbon atoms, a substituted alkenyl group having 1 to 30 carbon atoms, a polyoxy lower alkyl group or a polyoxy lower alkenyl group, provided that at least one of $R_3$, $R_4$, $R_5$ and $R_6$ is an alkyl or alkenyl group having 10 or more carbon atoms, a polyoxy lower alkyl group or a polyoxy lower alkenyl group, and k is an integer of 1 to 8, provided that the lower alkyl group and the lower alkenyl group in the present invention have 1 to 4 carbon atoms,

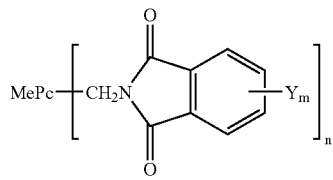

(3)

wherein Me, Pc and n have the same meanings as those in the formula (1), Y is a halogen atom, an alkyl group, a nitro group, an amino group, a sulfone group or a carboxyl group, and m is an integer of 0 to 4.

α crystal form copper phthalocyanine or a mixture of α crystal form copper phthalocyanine and the phthalocyanine derivative, used in the present invention, are obtained by adding a copper phthalocyanine or a copper phthalocyanine and a phthalocyanine derivative represented by the formula (1), (2) or (3) to 5 to 15 times by weight of 65 to 100% sulfuric acid, stirring the resultant mixture for 3 to 8 hours to prepare a suspension or solution of sulfate in the sulfuric acid, and pouring the suspension or the solution to 30 to 50 times by weight of water. Otherwise, a copper phthalocyanine is added to 5 to 15 times by weight of 65 to 100% sulfuric acid, the resultant mixture is stirred for 3 to 8 hours to prepare a suspension or solution of sulfate in the sulfuric acid, the suspension or the solution is poured to 30 to 50 times by weight of water to obtain an α crystal form copper phthalocyanine, and the αcrystal form copper phthalocyanine and a phthalocyanine derivative represented by the formula (1), (2) or (3) are dry-blended or slurry-blended, thereby obtaining the α crystal form copper phthalocyanine or the mixture of α crystal form copper phthalocyanine and the phthalocyanine derivative. As described above, sulfuric acid is generally used as an acid for producing the α crystal form copper phthalocyanine. When a sulfuric acid having a concentration of at least eighty-odd % is used, the copper phthalocyanine is in the state of a highly-viscous solution. Therefore, this process is called "acid pasting process". On the other hand, when a sulfuric acid having a concentration of from sixty-odd % to eighty-odd % is used, the copper phthalocyanine is in the state where its sulfate is dispersed. Therefore, this process is called "acid slurry process".

In the present invention, when the copper phthalocyanine and the phthalocyanine derivative are used, the amount of the phthalocyanine derivative per 100 parts by weight of the copper phthalocyanine is 0.5 to 50 parts by weight, preferably 1 to 10 parts by weight. When the amount of the phthalocyanine derivative is smaller than the above lower limit, the effect of the addition of the phthalocyanine derivative is poor. When it exceeds the above upper limit, the effect of the addition does not increase and it is uneconomical.

The crystal form of the copper phthalocyanine or the mixture of the copper phthalocyanine and the phthalocyanine derivative in the present invention is not limited to the α crystal form. For example, the δ crystal form or the γ crystal form, each of which has a larger potential energy than the ε crystal form, may be used in place of the α crystal form. However, the α crystal form is advantageous since the production is easy.

The solvent suitable for use in the present invention can be selected from tertiary alkyl benzenes such as tert-butyl-benzenes or tert-amylbenzenes, nitrobenzenes, alicyclic compounds such as sulfolane, and mixtures of these.

The heat-treatment temperature in the present invention is from 80 to 250° C., preferably from 120 to 180° C. When the temperature is lower than 80° C., the transformation from the α form into the ε form does not occur. When the temperature is higher than 250° C., disadvantageously as a pigment, primary crystals grow and in addition thermal energy is wasteful.

The Lewis acid suitable for use in the present invention is typically iodine, bromine or a quinone. Examples of the quinone include benzoquinone, naphthoquinone and p-chloranil. Of the Lewis acids, iodine and bromine are particularly excellent. The ligand field of a center metal copper atom of a copper phthalocyanine molecule in the β crystal form has an octahedral structure composed of four intramolecular pyrrolic nitrogen atoms and two adjacent-copper-phthalocyanine-intramolecular meso-position nitrogen atoms. This structure is a main factor for the stability of the β crystal form. It can be thought that the function of mechanical force mentioned in the prior arts of the invention is to mechanically suppress the axial coordination of the two adjacent-copper-phthalocyanine-intramolecular meso-position nitrogen atoms with the copper atom and prevent the transformation into the β crystal form. On the contrary, the Lewis acids chemically carry out the suppression. The frontier electron density of meso-position nitrogen atoms is the largest in copper phthalocyanine molecule. For this reason, the meso-position nitrogen atoms have a high coordinating property with regard to an acid or a metal atom vacant orbital. It is thought that the Lewis acid forms an charge-transfer complex with copper phthalocyanine and thereby decreases the electron density of the meso-position nitrogen atoms to suppress the coordination with the copper atom.

The molar ratio of the amount of the Lewis acid used in the present invention to the total amount of the phthalocyanine compounds is from 0.01 to 2.0, preferably from 0.05 to 0.5. In the present invention, the term "the total amount of phthalocyanine compounds" refers to the total amount of the copper phthalocyanine and the phthalocyanine derivative.

In the treatment with the solvent, it is preferable that an ε crystal form copper phthalocyanine coexists as a seed crystal. This is because the seed crystal has the effect of increasing the initial transformation speed by means of a crystal nucleus effect. The amount of the ε crystal form copper phthalocyanine is preferably ⅕ to ¹/₁₀ based on the total amount of the copper phthalocyanine or the mixture of the copper phthalocyanine and the phthalocyanine derivative.

The ε crystal form copper phthalocyanine obtained by the present invention has a specific surface area, according to the BET method, of $80\pm10$ $m^2 \cdot g^{-1}$. This is an extremely large value. The ε crystal form copper phthalocyanine has a quality sufficient for being directly used as a pigment for a gravure ink, an offset ink, a coating composition or a coloring resin, etc. For reference purposes, the specific surface area of β crystal form copper phthalocyanine pigments which are generally used is $65\pm10$ $m^2 \cdot g^{-1}$. The ε crystal form copper phthalocyanine in the form of a solvent-treated slurry, a refined solvent slurry or a powder, obtained by the present invention, is further subjected to pigmentation according to the solvent milling process or the solvent salt milling process, whereby the tinting strength or clearness is further improved and a pigment having a remarkably high quality can be easily produced.

The ε crystal form copper phthalocyanine containing no phthalocyanine derivative, obtained by the present invention, had a single exothermic peak in the temperature range of 425±25° C. in a differential thermal analysis carried out under air atmosphere at a temperature-increasing rate of 5° C.•min$^{-1}$. The above analysis result shows that the ε crystal form copper phthalocyanine of the present invention does not include a phthalocyanine compound other than copper phthalocyanine. This is first realized by the present invention.

COMPARATIVE EXAMPLE 73 parts by weight of a crude copper phthalocyanine and 7 parts by weight of tetrachlorophthalimide methylated copper phthalocyanine (the number of tetrachlorophthalimide methyl groups was 1/mol) were added to 500 parts by weight of 95% sulfuric acid, the mixture was stirred for 3 hours to prepare a sulfuric acid solution, and the sulfuric acid solution was poured to 4 liters of water. After filtering, the residual substance was washed with water and dried with hot-air. The thus obtained α crystal form copper phthalocyanine was pulverized.

Figure 2:
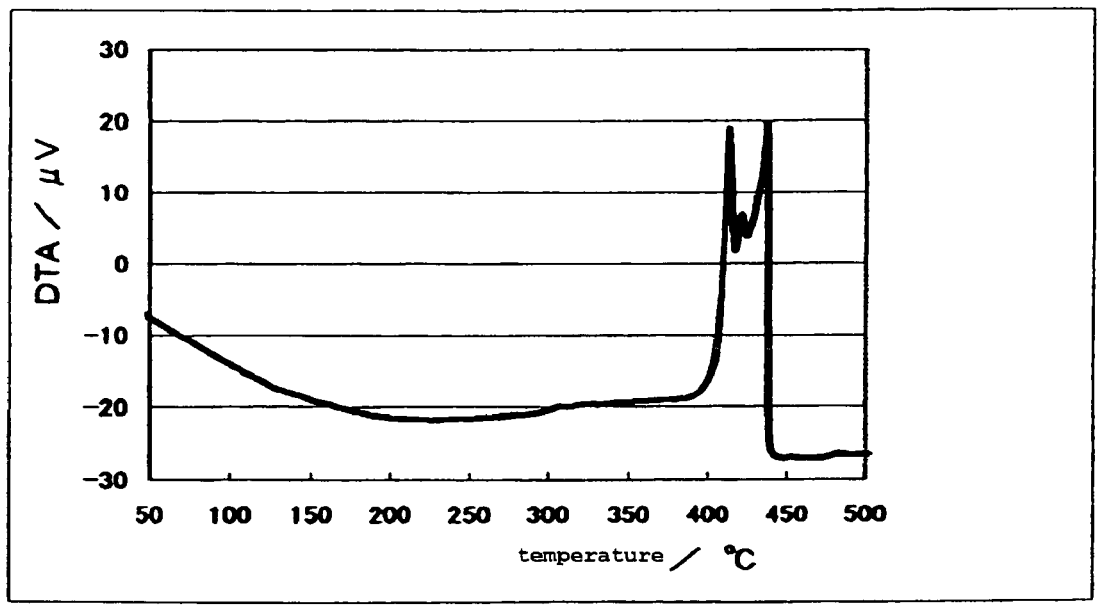
FIG. 2 shows the DTA curve of an ε crystal form copper phthalocyanine which was obtained in Comparative Example.

Then, the thus obtained mixture of the copper phthalocyanine and the phthalocyanine derivative together with 20 parts by weight of an ε crystal form copper phthalocyanine, 600 parts by weight of pulverized common salt and 100 parts by weight of polyethylene glycol were charged into a kneader, the mixture was milled at 100 to 140° C. for 10 hours. The resultant mixture was taken out and then refined with a 2% sulfuric acid solution, followed by filtering, washing with water and drying. The thus obtained pigment was in the ε crystal form. FIG. 1 shows its powder X-ray diffraction profile. FIG. 2 shows its DAT curve in a differential thermal analysis carried out under air atmosphere at a temperature-increasing rate of 5° C.•min$^{-1}$.

Example 1

85 parts by weight of a crude copper phthalocyanine was added to 500 parts by weight of 98% sulfuric acid and the mixture was stirred for 3 hours to prepare a sulfuric acid solution. The sulfuric acid solution was poured into 4 liters of water through an aspirator. After filtering, the residual substance was washed with water and dried with hot-air. The thus obtained α crystal form copper phthalocyanine was pulverized.

Figure 3:
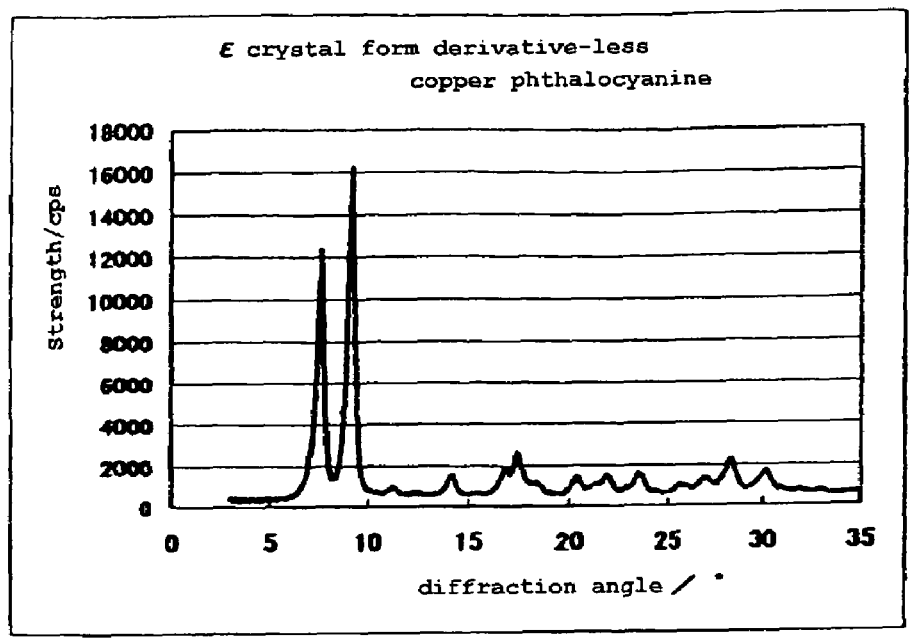
FIG. 3 shows the powder X-ray diffraction profile of an ε crystal form copper phthalocyanine which was obtained in Example 1.
Figure 4:
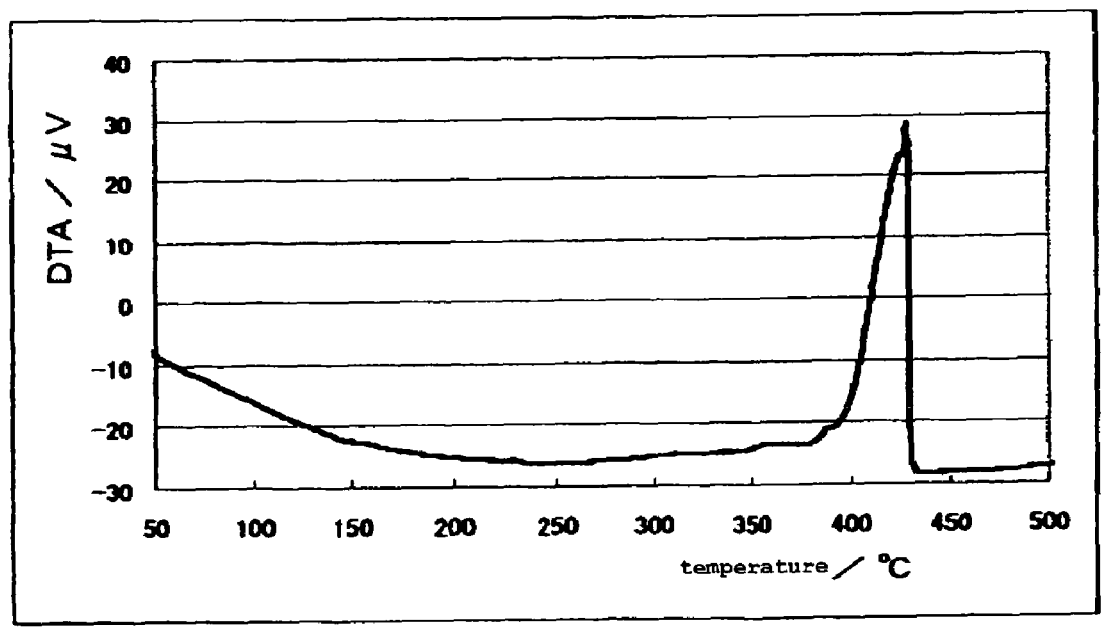
FIG. 4 shows the DTA curve of an ε crystal form copper phthalocyanine which was obtained in Example 1.

Then, the thus obtained fine α crystal form copper phthalocyanine together with 15 parts by weight of an ε crystal form copper phthalocyanine and 4 parts by weight of iodine were stirred in 1000 parts by weight of sulfolane under heat at 170° C. for 6 hours. The mixture was cooled down to about room temperature and then poured to 1,000 parts by weight of methanol. After filtering, the residual substance was washed with methanol and dried with hot air. There was quantitatively obtained an ε crystal form copper phthalocyanine containing no α form and no β form according to the powder X-ray diffraction analysis. FIG. 3 shows its powder X-ray diffraction profile. FIG. 4 shows its DAT curve in a differential thermal analysis carried out under air atmosphere at a temperature-increasing rate of 5° C.•min$^{-1}$. In the Comparative Example, two exothermic peaks existed in the temperature range of 425±25° C. On the contrary, the Example 1 had a single peak. The difference based on the presence or absence of derivative is obvious.

Example 2

80 parts by weight of a crude copper phthalocyanine was added to 500 parts by weight of 98% sulfuric acid and the mixture was stirred for 3 hours to prepare a sulfuric acid solution. The sulfuric acid solution was poured into 4 liters of water through an aspirator. After filtering, the residual substance was washed with water and dried with hot air. The thus obtained α crystal form copper phthalocyanine was pulverized.

Then, the thus obtained fine α crystal form copper phthalocyanine together with 20 parts by weight of an ε crystal form copper phthalocyanine and 8 parts by weight of bromine were stirred in 1,000 parts by weight of sulfolane under heat at 130° C. for 10 hours. The mixture was cooled down to about room temperature and then poured to 1,000 parts by weight of methanol. After filtering, the residual substance was washed with methanol and dried with hot air. There was quantitatively obtained an ε crystal form copper phthalocyanine containing no α form and no β form according to the powder X-ray diffraction analysis.

Example 3

80 parts by weight of a crude copper phthalocyanine and 8 parts by weight of tetrachlorophthalimide methylated copper phthalocyanine (the number of tetrachlorophthalimide methyl groups was 1/mol) were added to 500 parts by weight of 95% sulfuric acid and the mixture was stirred for 3 hours to prepare a sulfuric acid solution. The sulfuric acid solution was poured into 4 liters of water. After filtering, the residual substance was washed with water and dried with hot air. The thus obtained α crystal form copper phthalocyanine was pulverized.

Figure 5:
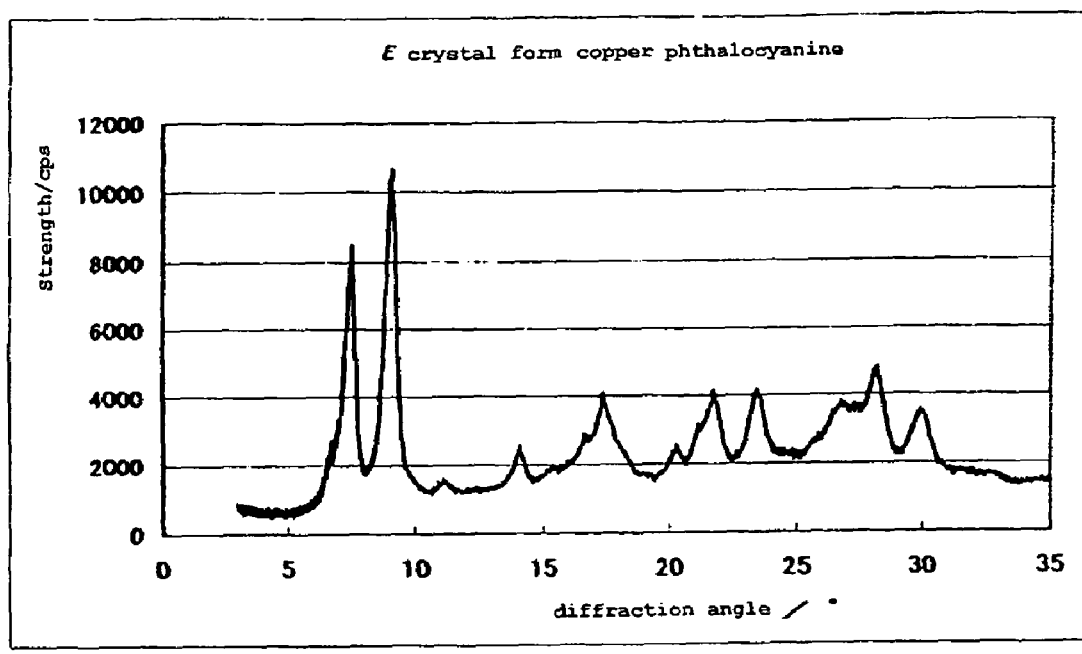
FIG. 5 shows the powder X-ray diffraction profile of an ε crystal form copper phthalocyanine which was obtained in Example 3.

Then, the thus obtained mixture of the copper phthalocyanine and the phthalocyanine derivative together with 12 parts by weight of an ε crystal form copper phthalocyanine and 13 parts by weight of iodine were stirred in 1,000 parts by weight of nitrobenzene under heat at 170° C. for 4 hours. The mixture was cooled down to about room temperature and then poured to 1,000 parts by weight of methanol. After filtering, the residual substance was washed with methanol and dried with hot air. There was quantitatively obtained an ε crystal form copper phthalocyanine containing no α form and no β form according to the powder X-ray diffraction analysis. FIG. 5 shows its powder X-ray diffraction profile.

Example 4

84 parts by weight of a crude copper phthalocyanine and 6 parts by weight of phthalimide methylated copper phthalocyanine (the number of phthalimidemethyl groups was 1/mol) were added to 500 parts by weight of 90% sulfuric acid and the mixture was stirred for 3 hours to prepare a sulfuric acid solution. The sulfuric acid solution was poured into 4 liters of water. After filtering, the residual substance was washed with water and dried with hot air. The thus obtained α crystal form copper phthalocyanine was pulverized.

Then, the thus obtained mixture of the copper phthalocyanine and the phthalocyanine derivative together with 10 parts by weight of an ε crystal form copper phthalocyanine and 3 parts by weight of bromine were stirred in 700 parts by weight of tert-amylbenzene under heat at 180° C. for 6 hours. The mixture was cooled down to about room temperature and then poured to 700 parts by weight of methanol. After filtering, the residual substance was washed with methanol and dried with hot air. There was quantitatively obtained an ε crystal form copper phthalocyanine containing no α form and no β form according to the powder X-ray diffraction analysis.

Example 5

78 parts by weight of a crude copper phthalocyanine was added to 500 parts by weight of 98% sulfuric acid and the mixture was stirred for 3 hours to prepare a sulfuric acid solution. The sulfuric acid solution was poured into 3.5 liters of water. After filtering, the residual substance was washed with water and dried with hot air. The thus obtained α crystal form copper phthalocyanine was pulverized.

Then, the thus obtained copper phthalocyanine together with 5 parts by weight of $CuPc-SO_3^-N^+H_3(C_{18}H_{37})$, 17 parts by weight of an ε crystal form copper phthalocyanine and 10 parts by weight of bromine were stirred in 700 parts by weight of sulfolane under heat at 130° C. for 6 hours. The mixture was cooled down to about room temperature and then poured to 700 parts by weight of methanol. After filtering, the residual substance was washed with methanol and dried with hot air. There was quantitatively obtained an ε crystal form copper phthalocyanine containing no α form and no β form according to the powder X-ray diffraction analysis.

Example 6

79 parts by weight of a crude copper phthalocyanine was added to 500 parts by weight of 98% sulfuric acid and the mixture was stirred for 3 hours to prepare a sulfuric acid solution. The sulfuric acid solution was poured into 3.5 liters of water. After filtering, the residual substance was washed with water and dried with hot air. The thus obtained α crystal form copper phthalocyanine was pulverized.

Then, the thus obtained copper phthalocyanine together with 7 parts by weight of $CuPc-CH_2NHCOCH_2NH(CH_2)_3N(C_2H_5)_2$, 14 parts by weight of an ε crystal form copper phthalocyanine and 12 parts by weight of iodine were stirred in 1,000 parts by weight of tert-amylbenzene under heat at 160° C. for 3 hours. The mixture was cooled down to about room temperature and then poured to 1,000 parts by weight of methanol. After filtering, the residual substance was washed with methanol and dried with hot air. There was quantitatively obtained an ε crystal form copper phthalocyanine containing no α form and no β form according to the powder X-ray diffraction analysis.

Example 7

86 parts by weight of a crude copper phthalocyanine and 4 parts by weight of phthalimide methylated copper phthalocyanine (the number of phthalimide methyl groups was 1/mol) were added to 500 parts by weight of 100% sulfuric acid and the mixture was stirred for 3 hours to prepare a sulfuric acid solution. The sulfuric acid solution was poured into 4 liters of water. After filtering, the residual substance was washed with water and dried with hot air. The thus obtained α crystal form copper phthalocyanine was pulverized.

Then, the thus obtained mixture of the copper phthalocyanine and the phthalocyanine derivative together with 10 parts by weight of an ε crystal form copper phthalocyanine and 4 parts by weight of iodine were stirred in 700 parts by weight of sulfolane under heat at 140° C. for 2 hours. The mixture was cooled down to about room temperature and then poured to 700 parts by weight of methanol. After filtering, the residual substance was washed with methanol and dried with hot air. There was quantitatively obtained an ε crystal form copper phthalocyanine containing no α form and no β form according to the powder X-ray diffraction analysis.

Example 8

72 parts by weight of a crude copper phthalocyanine and 8 parts by weight of tetrachlorophthalimide methylated copper phthalocyanine (the number of tetrachlorophthalimide methyl groups was 1/mol) were added to 500 parts by weight of 98% sulfuric acid and the mixture was stirred for 2 hours to prepare a sulfuric acid solution. The sulfuric acid solution was poured into 4 liters of water. After filtering, the residual substance was washed with water and dried with hot air. The thus obtained α crystal form copper phthalocyanine was pulverized.

Then, the thus obtained mixture of the copper phthalocyanine and the phthalocyanine derivative together with 20 parts by weight of an ε crystal form copper phthalocyanine and 9 parts by weight of p-benzoquinone were stirred in 1,000 parts by weight of nitrobenzene under heat at 120° C. for 8 hours. The mixture was cooled down to about room temperature and then poured to 1,000 parts by weight of methanol. After filtering, the residual substance was washed with methanol and dried with hot air. There was quantitatively obtained an ε crystal form copper phthalocyanine containing no α form and no β form according to the powder X-ray diffraction analysis.

What is claimed is:

1. A process for the production of an ε crystal form copper phthalocyanine, which process comprises heat-treating a copper phthalocyanine in a solvent at a temperature of 80° C. to 250° C. in the presence of at least one of a Lewis acid selected from the group consisting of iodine, bromine or a quinone in an amount of 0.01 to 2.0 to the amount of the copper phthalocyanine, as a molar ratio.

2. The process according to claim 1, wherein the copper phthalocyanine is in the form of α crystals alone or a mixture thereof with ε crystals.

3. The process according to claim 1, wherein the copper phthalocyanine is in the form of α crystals alone, said crystals obtained by an acid pasting method or an acid slurry method or a mixture thereof with ε crystals.

4. A process for the production of an ε crystal form copper phthalocyanine, which process comprises heat-treating a mixture of 100 parts by weight of a copper phthalocyanine with 0.5 to 50 parts by weight of a phthalocyanine derivative in a solvent at a temperature of 80° C. to 250° C. in the presence of at least one of a Lewis acid selected from the group consisting of iodine, bromine or a quinone in an amount of 0.01 to 2.0 to the total amount of the copper phthalocyanine and the phthalocyanine derivative, as a molar ratio.

5. The process according to claim 4, wherein the copper phthalocyanine is in the form of α crystals alone or a mixture thereof with ε crystals.

6. The process according to claim 4, wherein the copper phthalocyanine or the mixture of the copper phthalocyanine with the phthalocyanine derivative is in the form of α crystals alone, said crystals obtained by an acid pasting method or an acid slurry method or a mixture thereof with ε crystals.

7. The process according to claim 4, wherein the phthalocyanine derivative is represented by formula (1), formula (2) or formula (3), MePc-[X-(CH$_2$)jNR$_1$R$_2$]n  (1)

wherein Me is H$_2$, Cu, Fe, Co, Ni, Zn, AlOH or FeOH, Pc is a phthalocyanine residue, X is —CH$_2$—, —CH$_2$NHCOCH$_2$—, —CO—, —SO$_2$—, —CH$_2$NH—, —CH$_2$NHCOCH$_2$NH—, —CONH— or —SO$_2$NH—, each of R$_1$ and R$_2$ is independently a hydrogen atom, an alkyl group having 1 to 18 carbon atoms, a substituted alkyl group having 1 to 18 carbon atoms, an alkenyl group having 1 to 18 carbon atoms or a substituted alkenyl group having 1 to 18 carbon atoms, or R$_1$ and R$_2$ together form a five-membered or six-membered ring which may contain a further nitrogen atom, j is an integer of 0 to 6, and n is an integer of 1 to 3, MePc-(SO$_3$—N+R$_3$R$_4$R$_5$R$_6$)k  (2)

wherein Me and Pc have the same meanings as those in formula (1), each of R$_3$, R$_4$, R$_5$ and R$_6$ is independently a hydrogen atom, an alkyl group having 1 to 30 carbon atoms, a substituted alkyl group having 1 to 30 carbon atoms, an alkenyl group having 1 to 30 carbon atoms, a substituted alkenyl group having 1 to 30 carbon atoms, a polyoxy lower alkyl group or a polyoxy lower alkenyl group, provided that at least one of R$_3$, R$_4$, R$_5$ and R$_6$ is an alkyl or alkenyl group having 10 or more carbon atoms, a polyoxy lower alkyl group or a polyoxy lower alkenyl group, and k is an integer of 1 to 8,

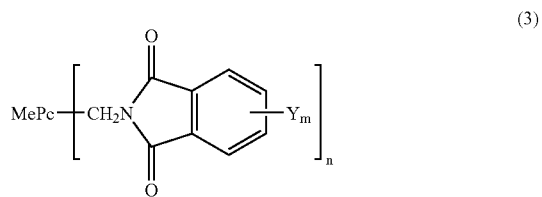

(3)

wherein Me, Pc and n have the same meanings as those in the formula (1), Y is a halogen atom, an alkyl group, a nitro group, an amino group, a sulfone group or a carboxyl group, and m is an integer of 0 to 4.

8. The process according to claim 1, wherein the solvent is selected from tertiary alkyl benzenes, nitrobenzenes, alicyclic compounds and mixtures thereof.

9. The process according to claim 4, wherein the solvent is selected from tertiary alkyl benzenes, nitrobenzenes, alicyclic compounds and mixtures thereof.

* * * * *